United States Patent [19]

Hilbertz

[11] 4,440,605
[45] Apr. 3, 1984

[54] REPAIR OF REINFORCED CONCRETE STRUCTURES BY MINERAL ACCRETION

[75] Inventor: Wolf H. Hilbertz, Austin, Tex.

[73] Assignee: The Marine Resources Company, Galveston, Tex.

[21] Appl. No.: 234,321

[22] Filed: Feb. 13, 1981

[51] Int. Cl.³ .......................... C25B 1/00; C25D 9/08
[52] U.S. Cl. ..................................... 204/16; 204/130
[58] Field of Search ................................ 204/16, 130

[56] References Cited

U.S. PATENT DOCUMENTS

| | | | |
|---|---|---|---|
| 828,976 | 8/1906 | Schneider | 204/130 |
| 3,398,071 | 8/1968 | Bagno | 204/130 |
| 3,523,884 | 8/1970 | Bagno | 204/130 |
| 4,246,075 | 1/1981 | Hilbertz | 204/1 R |

*Primary Examiner*—T. Tufariello
*Attorney, Agent, or Firm*—Arnold, White & Durkee

[57] ABSTRACT

By establishing a direct electrical current between electrodes in an electrolyte, such as seawater or fresh water containing minerals in solution, calcium carbonates, magnesium hydroxides, and hydrogen are precipitated at the cathode, while at the anode, oxygen and chlorine are produced. The electrochemical precipitation of minerals at and in the vicinity of metal reinforcement in a reinforced concrete structure is utilized to repair damaged portions thereof, for example, fractures, cracks, fissures, and voids.

To repair reinforced concrete structures, the structure is disposed in a volume of electrolyte. The metal reinforcement is made a cathode by connection to the negative terminal of a suitable DC power supply. One or more anodes are disposed in proximity to the structure, and a direct electrical current is established between the electrodes for a period of time sufficient to fill by accretion cracks, fissures or voids in the concrete body of the structure.

5 Claims, 4 Drawing Figures

REPAIR OF REINFORCED CONCRETE STRUCTURES BY MINERAL ACCRETION

BACKGROUND OF THE INVENTION

The present invention relates generally to construction materials and processes; and more particularly, it relates to the electrodeposition of minerals to repair damaged concrete structures having embedded metal reinforcement.

Seawater contains nine major elements: sodium, magnesium, calcium, potassium, strontium, chlorine, sulphur, bromine, and carbon. These elements comprise more than 99.9% of the total dissolved salts in the ocean (see Milliman, et al., *Marine Carbonates*, Springer-Verlag, N.Y., 1974; Sverdrup, et al., *The Oceans: Their Physics, Chemistry, and General Biology*, Prentiss-Hall, Inc., in N.J. 1942; and Culkin and Goldbert in Volume 1, *Chemical Oceanography*, pp. 121–196, Academic Press, London 1965). The constancy of the ratios of the major elements throughout the oceans has long been well-known (Dittmar, Challenger Reports, Physics and Chemistry, pp. 1–251, 1884).

In 1940 and 1947, G. C. Cox was issued U.S. Pat. Nos. 2,200,469 and 2,417,064, outlining methods of cathodic cleaning and protection of metallic surfaces submerged in seawater by means of a direct electrical current. During the cleaning process, a coating is also formed cathodically, consisting of magnesium and calcium salts (Eickhoff and Shaw, Corrosion, No. 4, pp. 463–474, 1948). If these coatings are hard and continuous, they afford a considerable degree of corrosion protection to the enclosed metal (see Humble, Corrosion, No. 4, pp. 358–370, 1948, and Corrosion, Volume 4, No. 9, pp. 292–302, 1949)

Lower marine organisms utilize the minerals in solutions surrounding them to build structural formations. Mollusk shells, for example, are generally composed of calcium carbonate crystals enclosed in an organic matrix. A significant proportion of the soluble protein in the matrix is composed of a repeating sequence of aspartic acid separated by either glycine or serine (see Jope in Volume 26, *Comprehensive Biochemistry*, p. 749, Elsevier, Amsterdam, 1971). This sequence, comprising regular repeating negative charges, could bind $Ca^{2+}$ ions and thus perform an important function in mineralization of the template (Weiner and Hood, Volume 190, *Science*, pp. 987–989, 1975).

In 1978, Wolf H. Hilbertz reported the feasibility of using electrodeposited minerals as a building material for building components. (Hilbertz, W. H., Electrodeposition of Minerals in Seawater, *Oceans '78*, pp. 699–706, 1978.)

The art fails, however, to teach the repair of imperfect or damaged reinforced concrete structures through electrochemical precipitation of minerals, which is referred to herein as "mineral accretion".

SUMMARY OF THE INVENTION

In accordance with the present invention, a reinforced concrete structure which is in a damaged condition, by reason of fracture separations in the concrete body such as cracks, fissures, or voids, is repaired by accretion of a filler and binding material through the electrodeposition of minerals.

As used herein, "reinforced concrete structure" refers to a structure comprising a solid mass formed by concretion or coalesence of separate particles of matter in one body and having metal embedded therein such that the two materials act together in resisting forces. Typically, of course, the solid mass portion of the structure is made by mixing a cementing material, such as portland cement, and a mineral aggregate, such as sand and gravel, with water to cause the cement to set and bind the entire mass. The reinforcing metal is typically a steel member such as a bar.

Briefly summarized, the method of repairing a damaged reinforced concrete structure in accordance with the invention involves disposing the damaged concrete structure in a volume of electrolyte. The metal reinforcing member in the concrete structure is connected to the negative potential terminal of a direct current electrical power supply, making the member a cathode. An anode is disposed in the electrolyte in proximity to the concrete structure; and the anode is connected to the positive potential terminal of the direct current electrical power supply. A direct electrical current is then established between the cathode and the anode for a time sufficient for accreting a solid mass of high strength electrodeposited mineral material within the separation in the concrete structure to fill the same and bind opposing sides of the separation together.

The method is particularly suitable for repairing concrete piling or other like support structures, especially those located in seawater, since the repair operation can be made in-situ.

BRIEF DESCRIPTION OF THE DRAWINGS

A written description setting forth the best mode presently known for carrying out the present invention, and of the manner of implementing and using it, is provided by the following detailed description of an illustrative embodiment and example, which refers to the accompanying drawings wherein.

DETAILED DESCRIPTION OF THE INVENTION

A. General Discussion

The oceans hold in solution a great material resource, acting as a link in the continual and vital cycle of material from land to sea. Each year, rivers contribute $2.73 \times 10^9$ metric tons of newly-dissolved solids. In the 70.8% of the earth's surface which is covered by water, there are over 60 quadrillion tons of mineral resources (Wenk, E., Jr., "The Physical Resources Of The Ocean," *The Ocean*, W. J. Freeman and Co., 1969).

Apart from oxygen and hydrogen, one cubic mile of seawater contains:

chlorine: 89 500 000 t
sodium: 49 500 000 t
magnesium: 6 125 000 t
sulphur: 1 880 000 t
calcium: 1 790 000 t
potassium: 1 609 000t bromine: 306 000 t
carbon: 132 000 t
and 51 other minerals and elements.

The utilization of processes similar to those exhibited by the structural mechanisms of living organisms and in non-living environments, such as caverns, provides a mineral accretion technology which involves the deposition and calcification of minerals in solution for structural purposes. That is, through electrolytic processes (diagenesis) and subsequent biological phasing (biogenesis), unstructured materials are electrodeposited onto conductive forms and may be chemically transformed by biological organisms into materials with structural capabilities.

The deposition and calcification of minerals in the environment is made possible by the fact that the medium in which they are suspended, water, is an ampholyte—a substance which can behave as an acid or a base—making it the universal solvent. This unique quality is most simply illustrated by the structural and destructural system of caverns. When water contains carbon dioxide, which combines with water to make carbonic acid, materials are dissolved. When carbon dioxide escapes, water becomes a base and materials are precipitated as stalactites and stalagmites. Similar non-living processes occur throughout the environment in cycles of deposition and reclamation.

Electrolytic processes can be utilized to selectively precipitate materials onto suitable surfaces. A certain electrical potential between electrodes will deposit negative ions on the anode and positive ions on the cathode. During the electrodeposition process, there are three methods by which material can potentially be accreted on the cathode:

1. concentration gradients;
2. ionic attraction; and,
3. electric migration.

Figure 1:
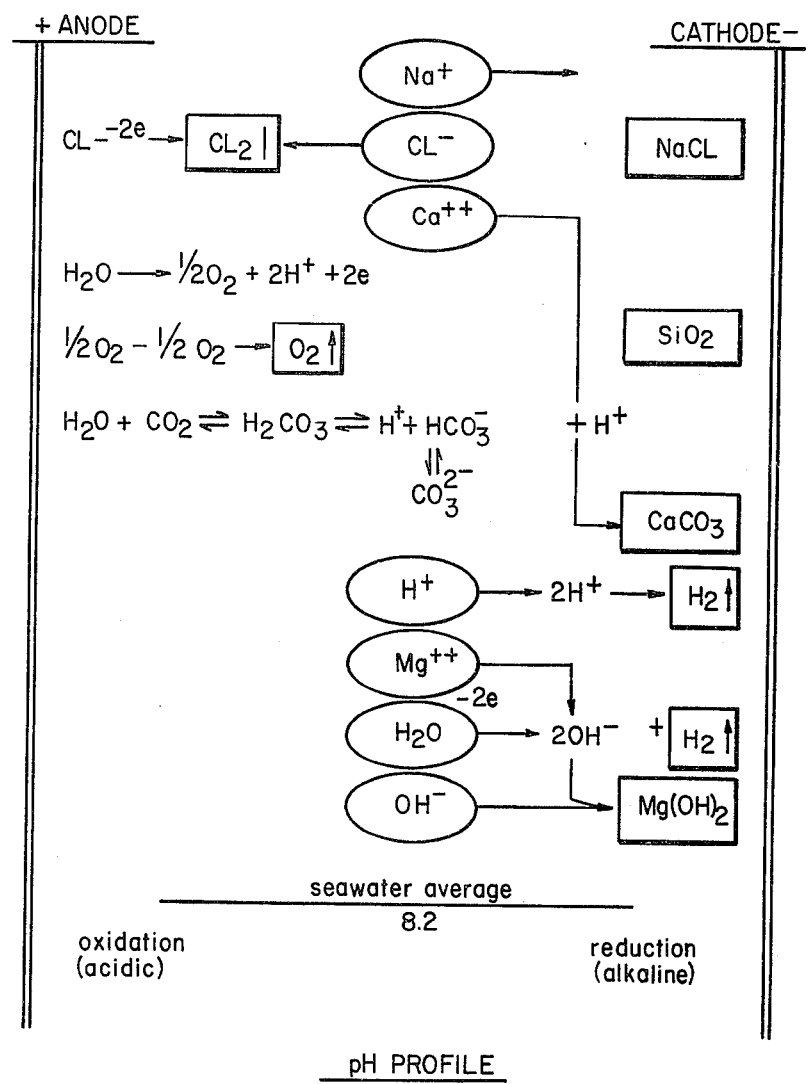
FIG. 1 depicts a theoretical qualitative model for the electrochemical processes involved in the accretion of minerals.

Although concentration gradients are most likely the cause of accretion, combinations of the three methods cannot be precluded. The basic model of the electrochemical reactions in a greatly simplified form is diagrammed in FIG. 1. In FIG. 1, the rectangular boxes represent either the mineral compounds precipitated from solution by the above methods, or the gases which are evolved. The arrows represent possible pathways of reactions according to the pH profile.

In addition to attracting ions, electrolysis of seawater produces heat at the electrode surfaces. The resistance is greatest at these surfaces; the temperature is, therefore, greater and the pH will rise. At first, the thermal decomposition removes the carbonic acid ($H_2CO_3$) allowing carbon dioxide ($CO_2$) to escape, which causes the hydrogen carbonate-carbonate equilibrium to shift to the carbonate side. The increased carbonate concentration, with increase in temperature and salinity, will increase the ionic product of calcium carbonate crystals, and induce precipitation. However, as the solution becomes more alkaline (at pH greater than 9), the ionic product of a brucite [$Mg(OH)_2$] will exceed the solubility product and brucite as well as the carbonates will be precipitated. The structural development in this case would be inhibited. It is also possible that amorphous matter enveloping the cathode, and the presence of other crystals such as phosphates, hydroxides, or sodium carbonate, inhibit the precipitation of calcium carbonate and prevent further growth of the crystals which do form.

It is evident from X-ray diffraction tests and chemical titration analysis that the greatest percentage of the material formed is brucite. It is found in two of its three distinct forms: the plate-like or foliate type; and massive material. Brucite, in its foliate form, is harder than talc or gypsum, and is not elastic; in its massive material form, it has a soapy appearance. It is possible that some small percentages of the composition consists of portlandite [$Ca(OH)_2$], which is isostructural with brucite. Fast precipitation of compounds from seawater usually results in brucite of the massive material form; slow precipitation usually results in brucite of the foliate crystalline structure. A major factor in the association of $Mg^{2+}$ in the form of $Mg(OH)_2$ is the reduction of $CO_2$ pressure in the upper reaches of the ocean. If the $CO_2$ pressure is increased to normal, lowering the pH, $Mg(OH)_2$ would revert to $MgCO_3$. Furthermore, the $MgCO_3$ would crystallize into available nuclei—i.e., aragonite and calcite.

B. Electrodeposition of Minerals to Repair Reinforced Concrete Structures

To illustrate the use of mineral electrodeposition for the repair of reinforced concrete structures, an example involving the repair of a concrete piling structure will be described.

As used herein, the term "a hard, strong material of high strength" is defined to be a material having a compression strength of at least 500 P.S.I. Also, as used herein, "concrete body" refers to a solid mass formed by concretion or coalesence of separate particles of matter in one body, for example, a solid mass made by mixing a cementing material, such as portland cement, and an aggregate material, such as sand and gravel, with water to cause the cement to set and bind the entire mass.

Figure 2:
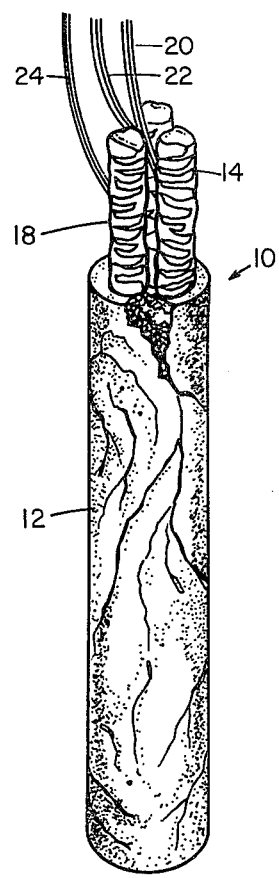
FIG. 2 is a perspective view of a damaged reinforced concrete structure.
Figure 3:
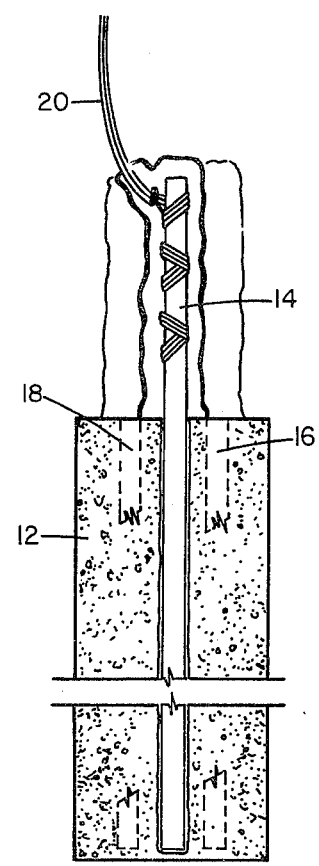
FIG. 3 is a cross-sectional view of the structure shown in FIG. 2.

Referring first to FIGS. 2 and 3, there is shown in perspective and in longitudinal cross-section view, respectively, a steel reinforced concrete structure 10 in the form of an elongated piling. Structure 10 comprises a body 12 of concrete configured as a cylindrical column. Embedded in the concrete body 12 are three steel reinforcing bars 14, 16, and 18. Concrete body 12 is damaged in that it is fractured and has numerous separations, such as cracks, fissures and voids. Each separation, of course, has opposing sides and goes to some depth into the concrete body. In certain places, the depth of the separation may be far enough into the concrete body that the steel bars are exposed, but need not be that deep.

To repair structure 10 in accordance with the invention, the cracks, fissures, and voids are filled with a solid mass of high strength electrodeposited mineral material which serves to bind opposing sides of each separation and strengthen the structure. This is accomplished by disposing the damaged concrete structure in a volume of electrolyte, for example, a mineral-containing liquid. One or more of the steel reinforcing bars is used as a cathode. An electrical connection is made to the steel bars by electrical cables. As shown in FIGS. 2 and 3, electrical cables 20, 22, and 24 are connected to bars 14, 16, and 18, respectively. As best shown in FIG. 3, electrical cable 20, which is illustrative of all the cables, is suitably a multistrand cable sized to carry the necessary current for proper accretion. The connection of cable 20 to steel bar 14 may suitably be by wrapping of the cable strands, after removal of the cable insulation, around the bar. The strands may also be soldered or welded to the bar to enhance the electrical connection.

The connection is insulated by embedding the connection in a suitable material such as silicon or epoxy.

One or more anodes are disposed in the electrolyte in proximity to the damaged concrete structure. The anode is suitably of one of the following materials: iron, steel, lead, graphite, carbon, platinum, columbium, or titanium. The anode is suitably sized for the particular structure being repaired. The anode is connected to the positive terminal of the direct current electrical power source.

Direct electrical current is established between the cathode and the anode to produce accretion of a solid mass of high strength electrodeposited mineral material within the separations in the concrete structure. Current is maintained for a time sufficient to fill the separations. Filling of the separations in the concrete structure in this manner binds opposing sides of the separations and enhances the strength of the concrete structure.

By way of an illustrative example, consider reinforced concrete structure 10 having dimensions of 20 feet in length and one foot in diameter. For such a structure, a suitable anode size is a surface area of 100 square inches. The direct current electrical power source desirably is capable of producing a peak power output of at least 1000 watts. To repair the structure 10 of the stated dimensions, a continuous output of 35 amperes at approximately 12 volts would be required, yielding a current density of 1 milliampere (mA) per square inch. The power source may be a battery charger, a welding generator, an array of photovoltaic cells, or a generator.

The mechanical properties of electrodeposited minerals obtained on one-half inch galvanized hardware cloth indicate that the material has a compression strength of 3720-5350 P.S.I. For comparison, normal portland cement type 1 concrete has a compression rating of 3500 P.S.I., and is typically used for stairs, steps, sidewalks, driveways, slabs on grade, and basement wall construction.

The strength of the material and the extent to which separations in a concrete body are filled will be affected by the rate of accretion. Fast accretion with a high current density gives lower strength; slower accretion with a lower current density yields a higher strength material. Strength may vary from 10-8000 P.S.I. Usable current density may range up to 50,000 mA per square foot, and electric field potential between the electrodes may range up to 50,000 volts.

In the foregoing discussion, a totally electrolytic process is described. However, damaged concrete structures may also be repaired by "phasing" which is a variation of the basic accretion process. "Phasing" as used herein refers to a process of accreting a structure in which electrodeposition (diagenesis) is first begun and continued through a first phase, and subsequently, during a second phase, the electrolytic process is discontinued and direct interaction of the deposited material with biological material (biogenesis) in the electrolyte proceeds, which may change the properties of the previously deposited material. After first and second phases, the process of repairing the structure may be considered to be complete or electrodeposition may be resumed. If desired, diagenesis and biogenesis may be alternatively repeated several times during the repair of a structure.

Another variation on the procedure followed in the foregoing discussion is that of switching the polarity of the electrodes (i.e., the cathode becomes the anode and vice-versa). By switching polarity of the electrodes, the material on what originally was the cathode is altered and the original anode material is integrated into an accreted material. The polarity may again be switched to re-establish the original electrode polarities; in fact, switching of electrode polarity may be done a number of times to achieve a desired composition of accreted filler material.

C. Specific Repair Application

Repair of damaged reinforced concrete structures by mineral accretion as taught by the present invention can contribute significantly to the solution of many formidable repair tasks. However, the repair method is particularly suited for repair tasks undertaken in the oceans. For those repair tasks, the present invention provides a method for in-situ repair of damaged reinforced concrete structures. One such repair task would be that of repairing a damaged concrete piling structure located in a body of water, for example, as used to support an offshore structure of some type (i.e., a pier, wharf, harbor markings, etc.).

Figure 4:
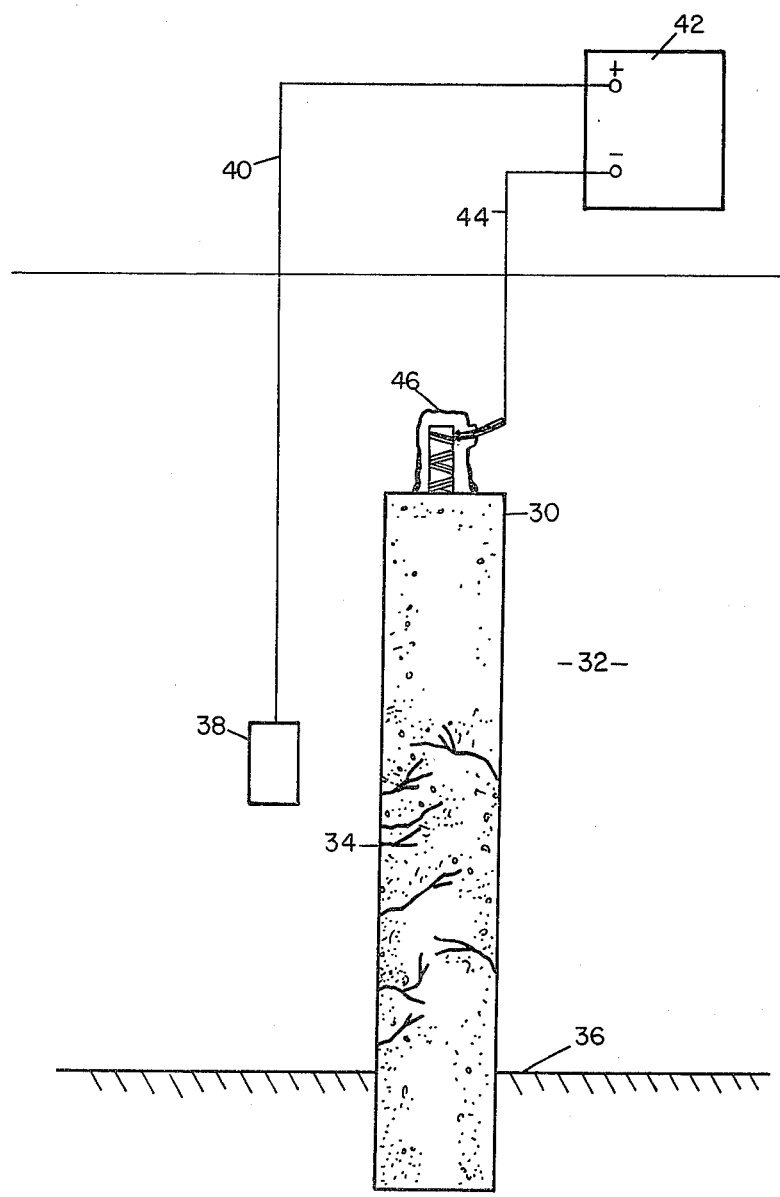
FIG. 4 is a schematic diagram of an arrangement for repairing in accordance with the present invention a reinforced concrete piling structure disposed in seawater.

In FIG. 4, there is a very simplified diagram of an arrangement for in-situ repair of a damaged concrete piling structure 30 which is disposed in a body of seawater 32. The damaged piling contains a number of cracks and fissures 34 in its midsection. As shown, the piling is driven into the sea bottom 36, and its upper end is disposed beneath the surface of the water. The upper end of the piling may, however, extend above the surface of the water. An anode 38 is disposed in the water in proximity to piling 30. Connection is made by cable 40 between anode 38 and the "+" terminal on DC power supply 42. The "−" terminal of the power supply is connected by cable 44 to a metal reinforcing member 46, which then acts as a cathode, embedded in the concrete body of piling 30, with the cable termination being insulated. Piling 30 repair through mineral accretion proceeds upon a direct electrical current being established between the anode and the cathode. Electrical current is maintained for a time sufficient to fill in the cracks and fissures.

The foregoing description of the invention has been directed to a particular concrete structure repair example for purposes of explanation and illustration. It will be apparent, however, to those skilled in this art that modifications and changes may be made in the method outlined without departing from the scope and spirit of the invention. It is the Applicant's intention in the following claims to cover such equivalent modifications and changes as fall within the scope of the invention as defined by the following claims.

What is claimed is:

1. A method of repairing a damaged concrete structure comprising a concrete body and a metal reinforcing member embedded therein, said structure being in a damaged condition by reason of a separation in the concrete body, comprising the steps of:
   disposing the damaged concrete structure in a volume of electrolyte;
   disposing an anode in the electrolyte in proximity to the concrete structure;
   connecting said anode to the positive potential terminal of a direct current electrical power supply;
   connecting the metal reinforcing member in said concrete structure to the negative potential terminal of said direct current electrical power supply, making said member a cathode; and
   establishing a direct electrical current between the cathode and the anode for a time sufficient for accreting a solid mass of high strength electrodeposited mineral material within the separation in the concrete body to fill the same and bind opposing sides of the separation together.

2. The method of claim 1 wherein the electrical current density is 1–50,000 mA/sq. ft.

3. The method of claim 1 wherein the electric field potential between the electrodes is 1–50,000 volts.

4. The method of claim 1 wherein the electrolyte is a mineral-containing liquid.

5. A method of repairing in-situ a damaged concrete piling structure disposed in seawater, and having a reinforcing steel member embedded therein, said damage comprising a fissure in the concrete of the structure, comprising the steps of:

connecting the reinforcing steel member of the damaged concrete structure to the negative electrode of a direct current electrical power source, to make said member a cathode;

disposing an anode in the seawater and in proximity to the concrete piling structure;

connecting said anode to the positive terminal of the direct current electrical power source; and establishing a direct electrical current between the cathode and the anode for a time sufficient for accreting a solid mass of high strength electrodeposited mineral material within the fissure in the concrete piling structure to fill the same and bind opposing sides of the fissure together.

* * * * *